US012713364B2

(12) United States Patent
Agneessens et al.

(10) Patent No.: US 12,713,364 B2
(45) Date of Patent: Aug. 18, 2026

(54) COMMUNICATION NODE FOR ADAPTIVELY CONTROLLING POWER CONSUMPTION

(71) Applicant: Telefonaktiebolaget LM Ericsson (publ), Stockholm (SE)

(72) Inventors: Sam Agneessens, Torslanda (SE); Mikael Coldrey, Borås (SE); Mikael Hörberg, Torslanda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 425 days.

(21) Appl. No.: 18/574,439

(22) PCT Filed: Jun. 30, 2021

(86) PCT No.: PCT/EP2021/068015
§ 371 (c)(1),
(2) Date: Dec. 27, 2023

(87) PCT Pub. No.: WO2023/274523
PCT Pub. Date: Jan. 5, 2023

(65) Prior Publication Data

US 2024/0298273 A1 Sep. 5, 2024

(51) Int. Cl.

*H04W 52/36* (2009.01)
*H04W 52/02* (2009.01)
*H04W 52/34* (2009.01)

(52) U.S. Cl.

CPC ..... *H04W 52/367* (2013.01); *H04W 52/0206* (2013.01); *H04W 52/343* (2013.01)

(58) Field of Classification Search

None
See application file for complete search history.

(56) References Cited

U.S. PATENT DOCUMENTS 6,584,330 B1 6/2003 Ruuska
2007/0036096 A1 2/2007 Sinivaara
(Continued)

FOREIGN PATENT DOCUMENTS

EP 1677471 A1 7/2006
WO 2010117313 A1 10/2010

OTHER PUBLICATIONS

International Search Report and Written Opinion dated Mar. 24, 2022 for International Application No. PCT/EP2021/068015 filed Jun. 30, 2021; consisting of 11 pages.
(Continued)

*Primary Examiner* — Angela Nguyen
(74) *Attorney, Agent, or Firm* — Weisberg I.P. Law, P.A.

(57) ABSTRACT

The present invention relates to a device and method for adaptively controlling power consumption in a communication node. The communication node includes a plurality of hardware units, including a modem and at least two transceiver branches, wherein each hardware unit may be powered on/off during operation of the communication node. The communication node is configured to determine current traffic requirements and to estimate future traffic requirements and then adapt the power consumption level by powering on/off the hardware units with regard to current traffic requirements and estimated future traffic requirements.

20 Claims, 5 Drawing Sheets

(56) References Cited

U.S. PATENT DOCUMENTS

| | | | | |
|---|---|---|---|---|
| 2016/0057651 | A1* | 2/2016 | Backholm ......... | H04W 28/0268 370/235 |
| 2016/0242129 | A1* | 8/2016 | Tachikawa .......... | H04W 52/343 |
| 2017/0118715 | A1* | 4/2017 | Bhattacharya .... | H04W 52/0277 |

OTHER PUBLICATIONS

3GPP TSG-RAN WG3 #112-e R3-212030; Title: AI based Energy Saving; Agenda item: 18.3; Source: ZTE, China Unicom, Lenovo, Motorola Mobility; Document for: Discussion and Approval; Date and Location: May 17-May 28, 2021, Online; consisting of 7 pages.

* cited by examiner

COMMUNICATION NODE FOR ADAPTIVELY CONTROLLING POWER CONSUMPTION

CROSS-REFERENCE TO RELATED APPLICATION

This application is a Submission Under 35 U.S.C. § 371 for U.S. National Stage Patent Application of International Application Number: PCT/EP2021/068015, filed Jun. 30, 2021 entitled "A COMMUNICATION NODE FOR ADAPTIVELY CONTROLLING POWER CONSUMPTION," the entirety of which is incorporated herein by reference.

TECHNICAL FIELD

The present invention relates to a method and apparatus in a communication node for adaptively controlling power consumption.

BACKGROUND

The focus on sustainability and reduced operational expenditure in radio access networks is constantly increasing. Many network operators have in anticipation of data traffic growth upgraded their wireless backhaul networks to account for the expected traffic increase. Hence, existing networks are often configured for capacities far beyond today's need. In addition, many backhaul links are underutilized, meaning they often operate only on a fraction of their peak capacity, which means they are consuming more power than needed.

Traffic aware power savings, or TAPS for short, is a feature that exists in today's radio link communication nodes. TAPS is based on the principle that output power can be adapted to the current traffic requirements. If the traffic requirements are low, the output power and thus the capacity of the radio link is adjusted to match current traffic requirements. This avoids wasting unnecessary power and limits unnecessary interference in the system. However, TAPS only saves energy by reducing the output power of the power amplifier. The reduced power consumption is marginal compared to the overall consumption of the communication node. The rest of the radio, which accounts for the major part of the power consumption, is unaffected. FIG. 1 illustrates an example of a communication node using TAPS.

As mentioned, a problem with TAPS is that the communication node will not be able to provide sufficient power savings. Currently, there exists no efficient implementations or methods that remedy this problem. Hence, there is a need for a more power efficient communication node that can adaptively control the power consumption based on data traffic requirements.

SUMMARY

It is an object of the present invention to remedy, or at least alleviate, some of these drawbacks and to provide a communication node that is able to adaptively reduce and control its power consumption.

According to a first aspect, the invention describes a communication node for adaptively controlling power consumption. The communication node comprises a plurality of hardware units, including a modem unit and at least two transceiver front-end units. Each of the hardware units is associated with a power consumption level, a data throughput and a wake-up time. The communication node comprises a processing unit configured to determine current traffic requirements and to estimate future traffic requirements based on at least one of current traffic requirements, historical data, weather information and network information. The communication node comprises a power control unit configured to adapt the power consumption level of the communication node by powering on/off the hardware units with regard to current traffic requirements and estimated future traffic requirements. The powering on/off may be performed such that the data throughput: 1) is higher than current traffic requirements, and 2) allows adapting to estimated future traffic requirements with regard to the wake-up times of the hardware units.

According to a second aspect, the invention describes a method in a communication node for adaptively controlling power consumption. The communication node comprising a plurality of hardware units, including a modem unit and at least two transceiver front-end units. Each of the hardware units is associated with a power consumption level, a data throughput and a wake-up time. The method comprises the step of determining current traffic requirements. The method comprises the step of estimating future traffic requirements based on at least one of current traffic requirements, historical data, weather information and network information. The method comprises the step of adapting the power consumption level of the communication node by powering on/off the hardware units with regard to current traffic requirements and estimated future traffic requirements. The step of adapting may further comprises powering on/off the hardware units such that the data throughput: 1) is higher than current traffic requirements, and 2) allows adapting to estimated future traffic requirements with regard to the wake-up times of the hardware units.

In the above communication node and method, redundant hardware units are powered off to reduce power consumption. Hence, the above communication node and method have the advantage of being able to provide a more power efficient communication node that can adaptively control the power consumption based on data traffic requirements.

The drawings are not necessarily to scale and the dimensions of certain features may have been exaggerated for the sake of clarity, emphasis is instead being placed upon illustrating the principle of the embodiments herein.

DETAILED DESCRIPTION

Two main embodiments of the present invention and several variants thereof are described in detail below with reference to FIGS. 2-5. A first embodiment of the invention relates to a communication node and a second embodiment relates to a method in a communication node. It should be noted that the scope of the present invention is not limited to the particular embodiments described herein, but only limited by the appended claims.

The following abbreviations are used in the text and the drawings:

DSP Digital Signal Processor
LO Local Oscillator
RAN Radio Access Network
RX Receiver
TAPS Traffic Aware Power Savings
TX Transmitter
TRX Transceiver
XPIC Cross-polar Interference Cancellation The invention relates to a communication node 200 and a method in a communication node for adaptively controlling power consumption by powering on/off different hardware units of the communication node.

In the following, features of the first embodiment and variants thereof are described with reference to FIGS. 2-3. The first embodiment relates to a communication node 200 configured to adaptively control power consumption.

Figure 1:
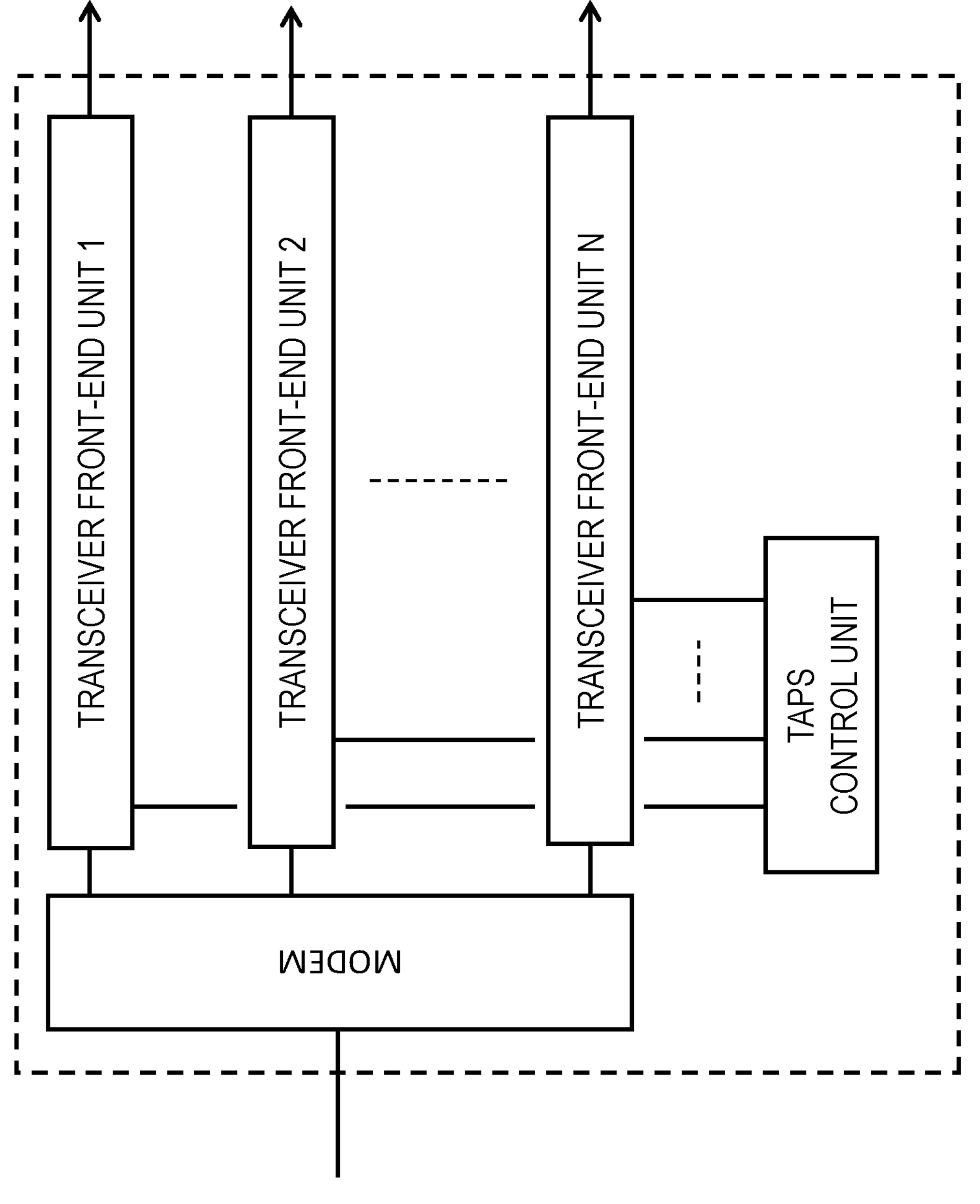
FIG. 1 shows schematically a blog diagram of a known communication system employing TAPS.
Figure 2:
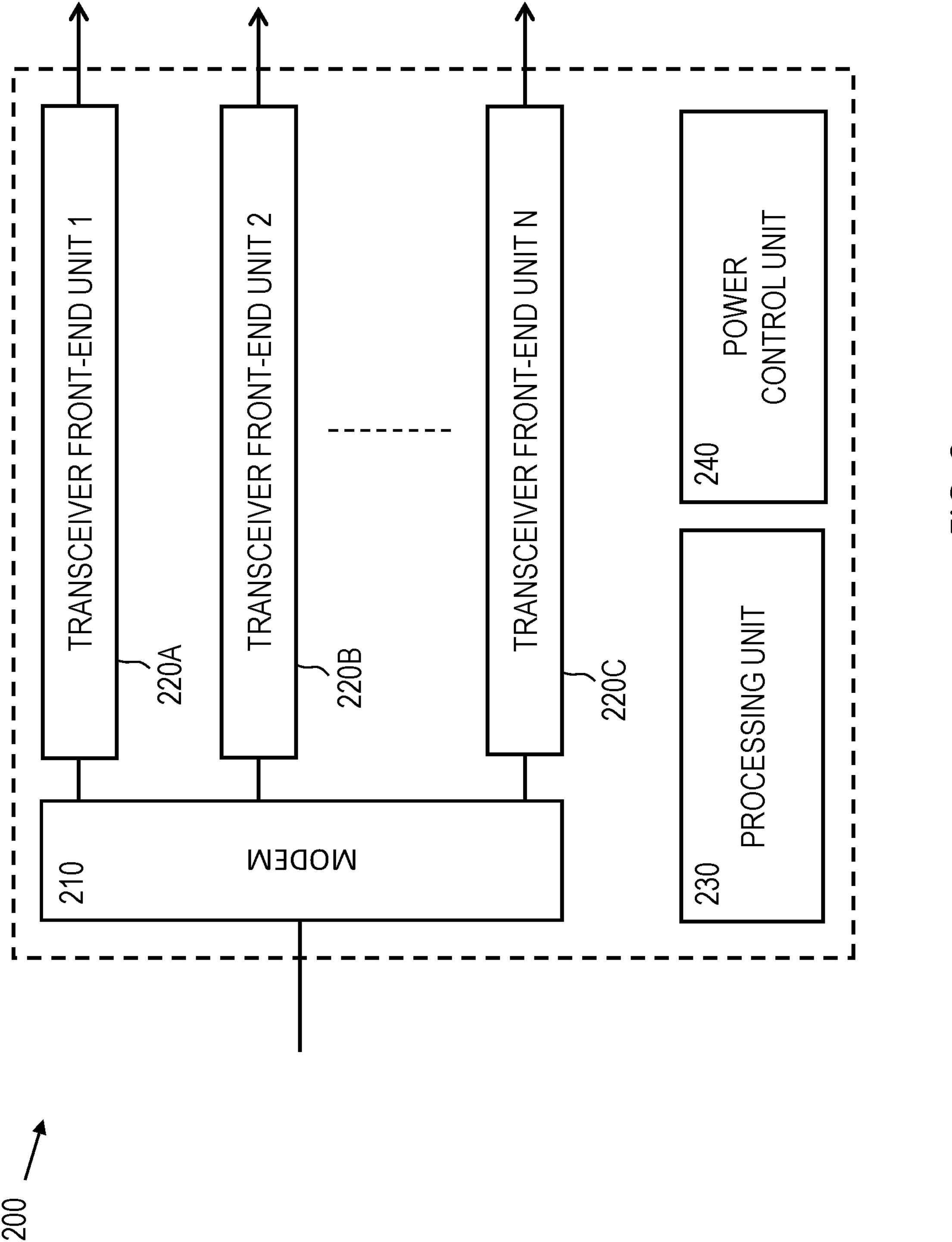
FIG. 2 shows schematically in a block diagram a first embodiment of the invention.
Figure 3:
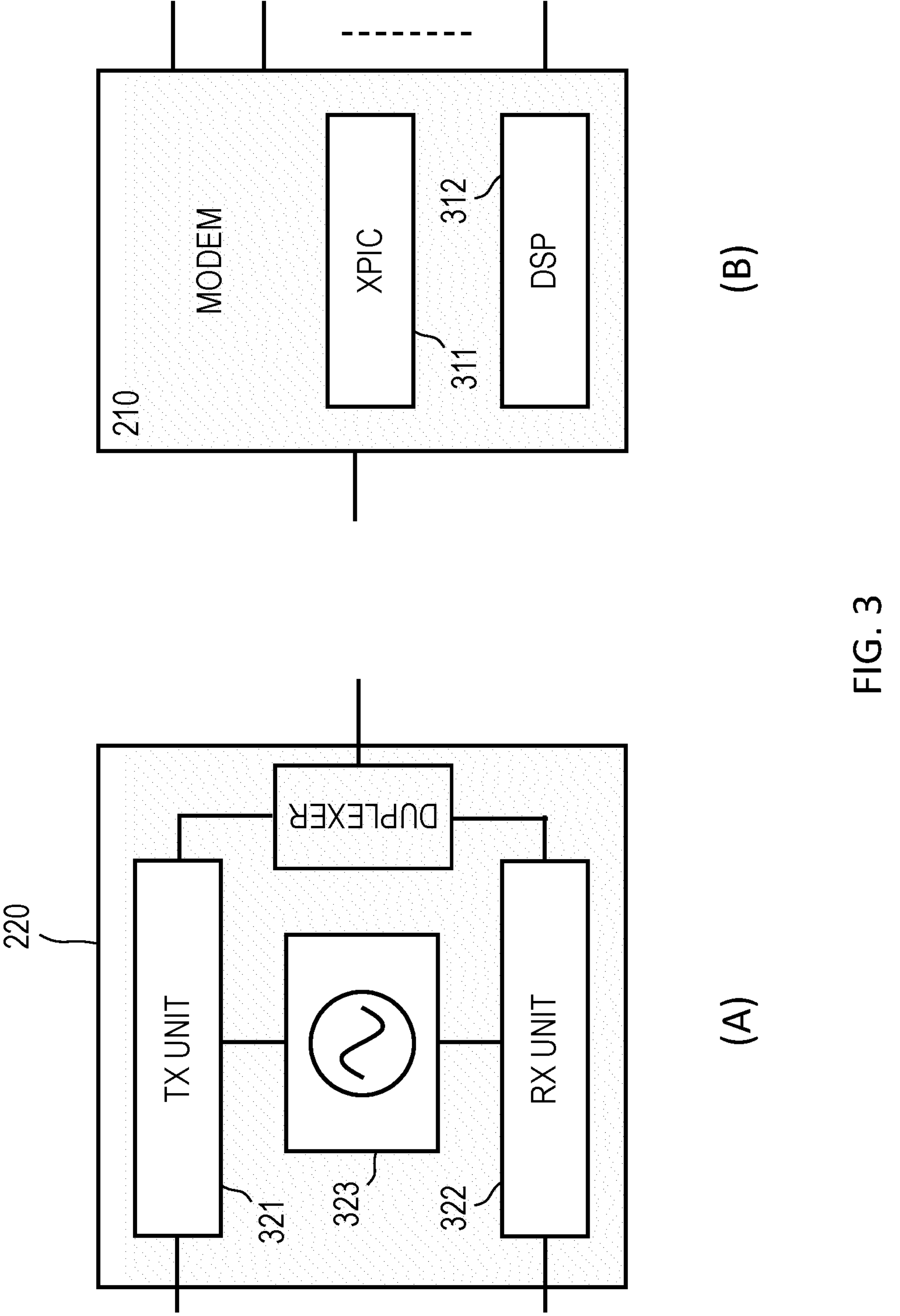
FIG. 3A shows schematically in a block diagram hardware units comprised within the transceiver front-end unit.
FIG. 3B shows schematically in a block diagram hardware units comprised within the modem unit.

FIG. 2 depicts a communication node 200 in accordance with the first embodiment. The communication node 200 comprises a plurality of hardware units 210, 220A, 220B, 220C, including a modem unit 210 and at least two transceiver front-end units 220A, 220B, 220C. The communication node also comprises a processing unit 230 and a power control unit 240. The communication node is generally configured to communicate with one far-end communication node but may also be configured to communicate with multiple far-end communication nodes.

Each hardware unit 210, 220A, 220B, 220C is associated with a power consumption level, a data throughput and a wake-up time. The wake-up time refers to the time between the hardware unit is powered on and the hardware unit is considered to be operational. The data throughput associated with a hardware unit typically refers to the amount of data passing through the hardware unit. The data throughput can also be an expected value of the amount of data that will be passing through the hardware unit. For example, a transceiver unit may for a particular implementation account for 50 percent of the total throughput of the communication node. Certain types of hardware units may affect the throughput indirectly by reducing performance when powered off, e.g. DSPs for baseband processing. The associated data throughput for such hardware units may be the expected throughput gain/loss when the hardware unit is powered on/off. Some hardware units affect all of the data passing through the communication node. For example, if the modem unit is powered off the resulting data throughput will be zero.

Each hardware unit 210, 220A, 220B, 220C may comprise further hardware units, where each constituent hardware unit is associated with a power consumption level, a data throughput and a wake-up time.

FIG. 3A depicts some examples of constituent hardware units comprised within the transceiver front-end units. In one example, the transceiver front-end unit comprises further hardware units such as a transmitter 321, a receiver 322, and an oscillator 323 that can each be powered on/off independently.

FIG. 3B depicts some examples of constituent hardware units comprised within the modem unit. In one example, the modem unit may comprise specific hardware accelerators 311 and a DSPs 312 for baseband signal processing that can each be powered on/off independently. In another example, the modem unit may comprise two constituent modem units operating in XPIC configuration with an intercommunication channel between the constituent modems. In yet another example, the modem unit may comprise constituent modem units operating in MIMO configuration with an intercommunication channel between the constituent modems. In these examples, each constituent modem can be powered on/off independently.

The communication node 200 further comprises a processing unit 230 configured to determine current traffic requirements and to estimate future traffic requirements based on at least one of current traffic requirements, historical data, weather information and network information. The traffic requirements typically comprise a minimum throughput requirement but may also comprise other parameters that affect the data throughput. For example, heavy rainfall will not change the minimum throughput requirement, but will instead cause impairments on the communication channel. Hence, the traffic requirements preferably comprise information about the channel conditions.

Current traffic requirements are the traffic requirements that the communication node 200 is expected to meet at the current moment. For example, the current traffic requirements may comprise already granted capacity requests from adjacent communication nodes in the network.

Future traffic requirements can be estimated by at least one of 1) current traffic requirements, 2) historical data, 3) weather information and 4) network information. Some examples on how the future traffic requirements can be estimated are:

1) Current traffic requirements may be used to estimate future traffic requirements. In one example, the current traffic requirements may comprise recently granted and not yet granted capacity requests from adjacent communication nodes in the network. These capacity requests may be used to estimate near-term traffic requirements.
2) Historical data may be used to estimate future traffic requirements. The historical traffic of the communication node can be used to build a model that predicts expected traffic requirements based on hour, day and/or month. For example, a communication node that serves a commuter area is likely to have peeks in the morning and afternoon during weekdays. Likewise, a communication node that serves an area where there is an entertainment complex or sports stadium can have very big fluctuations in the number of users and their data needs. Special events with different traffic requirements can be recognized in order for the communication node to also anticipate these.
3) Weather data may be used to estimate future traffic requirements. Weather data may comprise temperature, wind velocity, rain rate, and rain radar information that tracks moving rain zones and their intensity. A model that estimates when inclement weather will affect the communication node allows the communication node to adapt to possible channel impairments. Examples of weather conditions that would be beneficial for the backhaul link to adapt to pre-emptively are rainfall, strong winds, and fog.
4) Network data may be used to estimate future traffic requirements. In one example, network data comprises information on how traffic is moving between cells. For example, a large number of users on a train. Network data may also comprise RAN information. The prediction function could use information from the RAN that may comprise one or more of the following: 1) the current network load, 2) the number of users it is serving, 3) the current utilization, 4) the state of the base station (e.g. the buffer of the base station and information on whether the base station is in a sleep mode itself).

In one example, the future traffic requirements are only used as a trigger that signals a forthcoming change that the communication node will have to adapt to. In such case the future traffic requirements may be any arbitrary value that will force the communication node to power on idle hardware units.

The processing unit 230 may be configured to take asymmetry in upstream and downstream requirements into account. For example, the current traffic requirements and the future traffic requirements may both comprise upstream and downstream requirements.

The processing unit 230 is typically configured to update current traffic requirements and the estimated future traffic requirements continuously. Alternatively, the processing unit may be configured to update current traffic requirements and the estimated future traffic requirements after a predetermined interval has elapsed.

The processing unit 230 may be configured to estimate future traffic requirements comprising a near-term traffic requirement and a longer-term traffic requirement. For example, historical data is generally better for estimating longer-term traffic requirements, whereas network information might be more relevant for near-term traffic requirements.

The processing unit 230 may be implemented in many different ways. In one example, the processing unit 230 is implemented on an integrated circuit within the modem unit. In another example, the processing unit 230 is implemented as a stand-alone unit in the communication node. In yet another example, the processing unit 230 is implemented in a remote unit at a different geographical location. The processing unit 230 is connected, physically or wirelessly, to the power control unit 240.

The communication node 200 further comprises a power control unit 140 configured to adapt the power consumption level of the communication node by powering on/off the hardware units with regard to current traffic requirements and estimated future traffic requirements. This allows for reduced power consumption as redundant hardware units can be turned off when traffic requirements are low.

In one example, the powering on/off is performed such that the data throughput: 1) is higher than current traffic requirements, and 2) allows adapting to estimated future traffic requirements with regard to the wake-up times of the hardware units. This example may require the power control unit 140 to calculate a time at which the powering on/off should be performed. This may be of particular relevance when future traffic requirements are higher than the current traffic requirement and idle hardware units need to be powered on. The control unit 140 should then be configured to determine a time for powering on the hardware unit that is sufficiently early to allow for the wake-up time of the hardware unit. In case the calculated time is earlier than the current time, the power control unit may be configured to immediately power on the hardware unit.

In another example the powering on/off is performed such that the data throughput is higher than the maximum of current traffic requirements and estimated future traffic requirements. This example may be preferred in some implementations as there is no need to calculate a time at which the powering on/off is performed. It may be of particular relevance if the future traffic requirements are near-term estimates. It also avoids powering on and off a hardware too frequently.

The power control unit 140 may be configured to power on/off the hardware units in a predefined order. In this manner it's possible to define a number of different sleep modes. For example, if the predefined order is 1) TX/RX, 2) LO, and 3) modem, we obtain the following sleep modes:

| | |
|---|---|
| Fully Operational | On: Modem, TX, RX, LO |
| Sleep Mode 1 | On: Modem, LO<br>Off: TX, RX |
| Sleep Mode 2 | On: Modem<br>Off: TX, RX, LO |
| Sleep Mode 3 | Off: Modem, TX, RX, LO |

The power control unit 140 may also be configured to power on/off the hardware units in an order that minimizes redundancy. For example, the power control unit may power on/off the hardware unit such that power consumption is minimized while maintaining the required data throughput for current and future traffic requirements.

The power control unit 140 may also be configured to consider asymmetry between upstream traffic and downstream traffic. In one example, the power control unit is configured to power on/off the transmitter and receiver of a transceiver unit independently with regard to upstream and downstream requirements. For example, the power control unit 140 may be configured to power off the transmitter of a transceiver front-end unit, while leaving the receiver powered on. Here, any combination of the receiver and the transmitter being powered on or off is possible. This approach allows for reduced power consumption when asymmetry in uplink and downlink requirements is present.

The power control unit 240 may be implemented in many different ways. In one example, the power control unit 240 is implemented on an integrated circuit within the modem unit. In another example, the power control unit 240 is implemented as a stand-alone unit in the communication node. In yet another example, the power control unit 240 is implemented in a remote unit at a different geographical location. The power control unit 240 is connected, physically or wirelessly, to the hardware units.

In the following, features of the second embodiment and variants thereof are described with reference to FIG. 2-4. The second embodiment relates to a method in a communication node 200 for adaptively controlling power consumption.

FIG. 2 depicts a communication node 200 comprising a plurality of hardware units 210, 220A, 220B, 220C, including a modem unit 210 and at least two transceiver front-end units 220A, 220B, 220C. Each hardware unit 210, 220A, 220B, 220C is associated with a power consumption level, a data throughput and a wake-up time. Each hardware unit 210, 220A, 220B, 220C may comprise further hardware units, where each constituent hardware unit is associated with a power consumption level, a data throughput and a wake-up time.

FIG. 3A depicts some examples of hardware units comprised within the transceiver front-end units. In one example, the transceiver front-end unit comprises further hardware units such as a transmitter 321, a receiver 322, and an oscillator 323 that can each be powered on/off independently.

FIG. 3B depicts some examples of hardware units comprised within the modem unit. In one example, the modem unit may comprise specific hardware accelerators 311 and a DSPs 312 for baseband signal processing that can each be powered on/off independently. In another example, the modem unit may comprise two constituent modem units operating in XPIC configuration with an intercommunication channel between the constituent modems. In yet another example, the modem unit may comprise constituent modem units operating in MIMO configuration with an intercommunication channels between the constituent modems.

Figure 4:
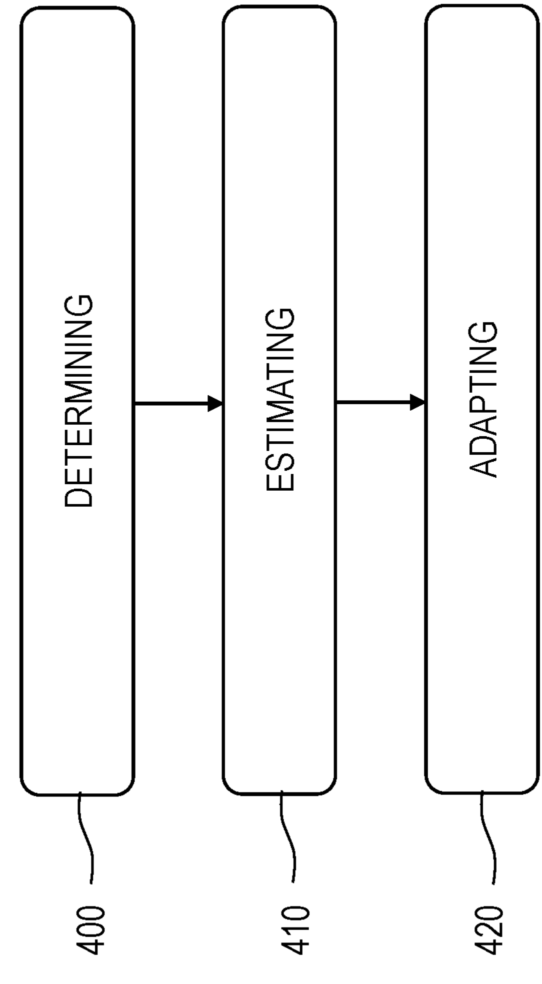
FIG. 4 shows schematically in a flowchart a method according to the second embodiment of the invention.

FIG. 4 depicts a method in accordance with the second embodiment. The method comprises the steps of determining 400, estimating 410 and adapting 420. The method is performed at least partly in a communication node that comprises a plurality of hardware units, including a modem unit and at least two transceiver front-end units. The communication node is generally configured to communicate with one far-end communication node but may also be configured to communicate with multiple far-end communication nodes.

The step of determining 400 comprises determining current traffic requirements. Current traffic requirements are the traffic requirements that the communication node 200 is expected to meet at the current moment. For example, the current traffic requirements may comprise already granted capacity requests from adjacent communication nodes in the network.

Determining 400 may also comprise taking asymmetry in upstream and downstream requirements into account. For example, current traffic requirements may comprise both upstream and downstream requirements.

The step of estimating 410 comprises estimating future traffic requirements based on at least one of current traffic requirements, historical data, weather information and network information. Some examples on how the future traffic requirements can be estimated are:

1) Current traffic requirements may be used to estimate future traffic requirements. In one example, the current traffic requirements may comprise recently granted and not yet granted capacity requests from adjacent communication nodes in the network. These capacity requests may indicate near-term data throughput requirement and can therefore be used to estimate near-term future traffic requirements.
2) Historical data may be used to estimate future traffic requirements. The historical traffic of the communication node can be used to build a model that predicts expected traffic requirements based on hour, day and/or month. For example, a communication node that serves a commuter area is likely to have peeks in the morning and afternoon during weekdays. Likewise, a communication node that serves an area where there is an entertainment complex or sports stadium can have very big fluctuations in the number of users and their data needs. Special events with different traffic requirements can be recognized in order for the communication node to also anticipate these.
3) Weather data may be used to estimate future traffic requirements. Weather data may comprise temperature, wind velocity, rain rate, and rain radar information that tracks moving rain zones and their intensity. A model that estimates when inclement weather will affect the communication node allows the communication node to adapt to possible channel impairments. Examples of weather conditions that would be beneficial for the backhaul link to adapt to pre-emptively are rainfall, strong winds, and fog.
4) Network data may be used to estimate future traffic requirements. In one example, network data comprises information on how traffic is moving between cells. For example, a large number of users on a train. Network data may also comprise RAN information. The prediction function could use information from the RAN that may comprise one or more of the following: 1) the current network load, 2) the number of users it is serving, 3) the current utilization, 4) the state of the base station (e.g. the buffer of the base station and information on whether the base station is in a sleep mode itself).

In one example, the future traffic requirements are only used as a trigger that signals a forthcoming change that the method in the communication node will have to adapt to. In such case the future traffic requirements may be any arbitrary value that will force the communication node to power on idle hardware units.

Estimating 410 may be performed continuously, or alternatively, be performed repeatedly after a predetermined interval has elapsed.

Estimating 410 may comprise taking asymmetry in upstream and downstream requirements into account. For example, future traffic requirements may comprise both upstream and downstream requirements.

Estimating 410 may comprise estimating future traffic requirements comprising a near-term traffic requirement and a longer-term traffic requirement. For example, historical data is generally better in estimating longer-term traffic requirements, whereas network information might be more relevant for near-term traffic requirements.

The step of adapting 420 comprises adapting the power consumption level of the communication node by powering on/off the hardware units with regard to current traffic requirements and estimated future traffic requirements. This allows for reduced power consumption as redundant hardware units can be turned off when traffic requirements are low.

In one example, adapting 420 comprises powering on/off hardware units such that the data throughput: 1) is higher than current traffic requirements, and 2) allows adapting to estimated future traffic requirements with regard to the wake-up times of the hardware units. The step of adapting may then further comprise calculating a time at which the powering on/off should be performed. This may be of particular relevance when future traffic requirements are higher than the current traffic requirement and idle hardware units need to be powered on. The calculated time for powering on a hardware unit should be sufficiently early to allow for the wake-up time of the hardware unit. In case the calculated time is earlier than the current time, the step of adapting may comprise powering on an idle hardware unit immediately.

In another example, adapting 420 may comprise powering on/off the hardware units such that the data throughput is higher than the maximum of current traffic requirements and estimated future traffic requirements. This example may be preferred in some implementations as there is no need to calculate a time at which the powering on/off is performed. It may be of particular relevance if the future traffic requirements are only near-term estimates. It also avoids powering on and off a hardware too frequently.

Adapting 420 may comprise powering on/off the hardware units in a predefined order. In this manner it's possible to define a number of different sleep modes.

Adapting 420 may comprise powering on/off the hardware units in an order that minimizes redundancy. For example, by powering on/off the hardware unit such that power consumption is minimized while maintaining the required data throughput for current and future traffic requirements.

Adapting 420 may comprise taking asymmetry between upstream traffic and downstream traffic into account. In one example, adapting comprises powering on/off the transmitter and receiver of a transceiver unit independently with regard to upstream and downstream requirements. For example, by powering off the transmitter of a transceiver front-end unit, while leaving the receiver powered on. Here, any combination of the receiver and the transmitter being powered on or off is possible. This approach allows for reduced power consumption when asymmetry in uplink and downlink requirements is present.

In the following, some alternative aspects of the invention are described.

The invention is a power savings feature and may use different sleep mode levels to save energy in the equipment. The deeper the sleep level is, the more energy is saved. For example, if the equipment is completely shut off then maximum energy savings is obtained. However, completely shut off equipment is not desired since at least parts of the equipment need to be in idle mode to be able to quickly resume operation when needed. It also takes time for the equipment to go into full operation from a sleep mode.

The invention uses the possibility to configure different carriers in a multi-carrier system into different sleep modes. For example, if the system has four carriers then they can all be in different sleep modes. For example, the first carrier can be fully awake and operating, the second carrier can be in a shallow sleep mode, the third carrier can be in a medium sleep mode and the fourth carrier can be in the deepest sleep mode. If the system detects that an increase in capacity is needed, then the second carrier can quickly be activated and the third can go into a shallower sleep mode to allow faster wake-up if needed. All sleep modes can be dynamically adapted to capacity needs and necessary response times.

A multi-channel system may consist of identical units that jointly provide the capacity of the link and the power consumption is the sum of all units. In one example, the modem represents 80 percent of the power consumption of which a substantial part is due to the XPIC DSP. The transceiver branch (i.e. TX, RX and LO) represents the remaining 20 percent. Turning off radio blocks like the power amplifier in the RX chain or the TX chain can be done very fast and yields a decent power saving. In the modem even larger savings can be made, for example by turning off the DSP or reducing its performance, e.g. reducing clock frequency. Turning on and off the baseband processing may take longer than adapting the RX or TX blocks, and hence, the system needs more time to adapt to these changes.

Another example is the case of carrier aggregation. One transceiver may support two carriers and serve two baseband units in the modem. Depending on the capacity needs of the link, this system can be configured in different sleep modes or capacity configurations. The different parts of this system may also be configured in different states that have certain capacity-power consumption ratio. For example, changing the bandwidths and changing output power. Configuration updates may be done on a portion of the available channels, so that remaining channels can provide capacity for the backhaul link. Another example where different channels can be put into different levels of sleep mode and power consumption is for a multiband booster system.

In the following, some alternative aspects on how the capacity needs can be predicted are provided.

In one example, the network can sense or predict a future fading event by utilizing AMI info from neighboring links. Such an event can call for extra transmit power that needs a power amplifier booster to be activated, implying a wake-up of that circuitry. In another example, a wind event may be detected by neighboring links in the network. If the communication node is equipped with a smart antenna that has the ability to perform beamsteering or dynamic adaptation to counteract mast sway, this antenna can be powered on (or taken out of sleep mode). If the wind events in the network go down below a certain level again, the smart antennas can be put into sleep mode again. Other examples of events can be multipath fading, rain, or temporary large traffic increases.

In another example, the communication node can utilize information about how traffic is moving between cells from mobility information.

In another example, historical data such as varying capacity needs or varying propagation conditions over time can be used to predict capacity needs. For example, the capacity needs can vary throughout the year (e.g. less people in the office, mass events in certain locations, etc.) or during the day or week caused by people commuting or large crowd events. Environmental parameters, which affect the signal propagation, can also change over different time periods in a predictable manner, such as variation over the year. For example, rain intensity and water vapor. Changes might also happen throughout the day. For example, multipath fading typically occurs in the morning or evening during summer and affects lower bands more than higher bands. If a multiband booster system is employed, it can be configured to use more of the high band during the crucial hours of the day.

In another example, a separate communication channel between the communication node and the RAN node is used to enhance the quality of the prediction. The communication node is aware of what happens in the RAN (e.g. low load, high-interference, good/bad conditions, number of users in the cell, status of the buffer, etc.). The communication node can then adjust the capacity it provides based on the status of the RAN. This could be used in conjunction with historical data to predict the required backhaul capacity. For example, a mass event may occur at a time during which there are normally far less people. Based on the historical data, the system would be configured at low capacity, so several channels may be in sleep mode. At the beginning of the event, the RAN reports more users than regularly. This can trigger an action in the wireless backhaul system to respond and put some channels in a shallower sleep mode. If the RAN requirements keep increasing, the communication node can wake up more channels to provide the capacity required. When the event finishes, the communication node can reduce the capacity and possibly return to previous sleep modes. In this example, the system was able to avoid capacity shortage by being aware of the RAN while still saving energy when there was low traffic demand. If it only relied on historical data, it would not have been able to accommodate for the increased demand.

Figure 5:
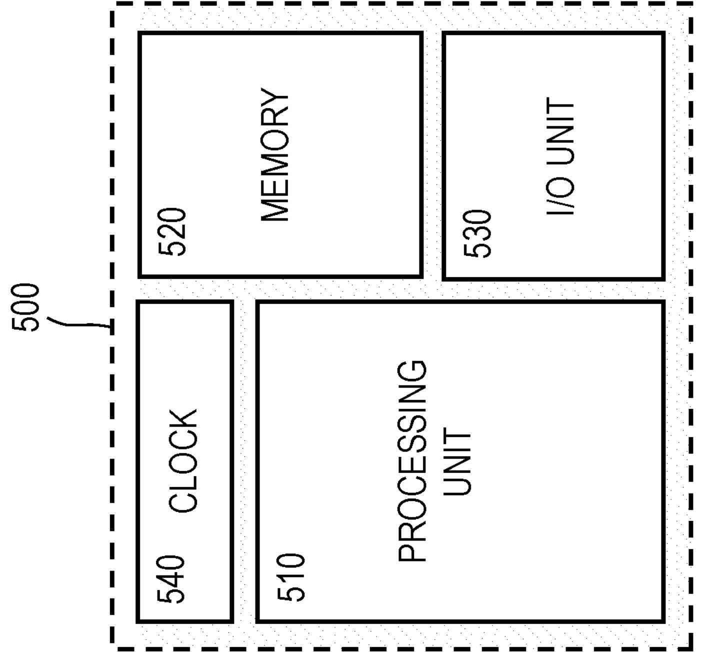
FIG. 5 shows schematically an example of a hardware implementation of the present invention.

According to yet another aspect of the invention, the communication node 200, 500 may be implemented as a processing unit 510, a memory 520, an input/output unit 530 and a clock 540 as is illustrated in FIG. 5. The processing unit 510, the memory 520, the I/O unit 530 and the clock 640 may be interconnected. The processing unit 510 may comprise a central processing unit, a digital signal processor, a multiprocessor system, programmable logic, a field programmable gate array (FPGA) or an application specific integrated circuit (ASIC) or any other type of logic. The memory 620 may comprise random access memory (RAM), read only memory (ROM) or any other type of volatile or non-volatile memory. The I/O unit 630 may comprise circuitry for controlling and performing signal conversions on I/O data and may further be connected to an antenna.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. A communication node for adaptively controlling power consumption, the communication node comprising:

a plurality of hardware units, including a modem unit and at least two transceiver front-end units wherein, each of the hardware units being associated with a power consumption level, a data throughput and a wake-up time;

a processing unit configured to determine current traffic requirements and to estimate future traffic requirements based on at least one of current traffic requirements, historical data, weather information and network information; and a power control unit configured to adapt the power consumption level of the communication node by powering on/off the hardware units with regard to current traffic requirements and estimated future traffic requirements.

2. The communication node of claim 1, wherein powering on/off is performed such that the data throughput:

is higher than current traffic requirements; and allows adapting to estimated future traffic requirements with regard to the wake-up times of the hardware units.

3. The communication node of claim 1, wherein powering on/off are performed such that the data throughput is higher than the maximum of current traffic requirements and estimated future traffic requirements.

4. The communication node of claim 1, wherein the power control unit is configured to power on/off the hardware units in a predefined order.

5. The communication node of claim 1, wherein the processing unit is further configured to estimate future traffic requirements comprising a near-term traffic requirement and a longer-term traffic requirement.

6. The communication node of claim 1, wherein the processing unit is configured to determine current traffic requirements and to estimate future traffic requirements that both comprise upstream requirements and downstream requirements.

7. The communication node of claim 6, wherein the power control unit is configured to power on/off the transmitter and receiver of a transceiver unit independently with regard to asymmetry in the upstream and downstream requirements.

8. A method in a communication node for adaptively controlling power consumption, the communication node comprising a plurality of hardware units, including a modem unit and at least two transceiver front-end units, each of the hardware units being associated with a power consumption level, a data throughput and a wake-up time, the method comprising the steps of:

determining current traffic requirements;

estimating future traffic requirements based on at least one of current traffic requirements, historical data, weather information and network information; and adapting the power consumption level of the communication node by powering on/off the hardware units with regard to current traffic requirements and estimated future traffic requirements.

9. The method of claim 8, wherein the step of adapting comprises powering on/off the hardware units such that the data throughput:

is higher than current traffic requirements, and allows adapting to estimated future traffic requirements with regard to the wake-up times of the hardware units.

10. The method of claim 8, wherein the step of adapting comprises powering on/off the hardware units such that the data throughput is higher than the maximum of current traffic requirements and estimated future traffic requirements.

11. The method of claim 8, wherein the step of adapting comprises powering on/off the hardware units in a predefined order.

12. The method of claim 8, wherein the step of estimating future traffic requirements comprises estimating a near-term traffic requirement and a longer-term traffic requirement.

13. The method of claim 8, wherein the step of determining current traffic requirements further comprises determining upstream traffic requirements and downstream traffic requirements and the step of estimating future traffic requirements further comprises estimating future upstream traffic requirements and future downstream traffic requirements.

14. The method of claim 13, wherein the step of adapting further comprises powering on/off the transmitter and the receiver of a transceiver unit independently with regard to upstream and downstream requirements.

15. The communication node of claim 2, wherein the power control unit is configured to power on/off the hardware units in a predefined order.

16. The communication node of claim 2, wherein the processing unit is further configured to estimate future traffic requirements comprising a near-term traffic requirement and a longer-term traffic requirement.

17. The communication node of claim 2, wherein the processing unit is configured to determine current traffic requirements and to estimate future traffic requirements that both comprise upstream requirements and downstream requirements.

18. The communication node of claim 3, wherein the power control unit is configured to power on/off the hardware units in a predefined order.

19. The communication node of claim 3, wherein the processing unit is further configured to estimate future traffic requirements comprising a near-term traffic requirement and a longer-term traffic requirement.

20. The communication node of claim 3, wherein the processing unit is configured to determine current traffic requirements and to estimate future traffic requirements that both comprise upstream requirements and downstream requirements.

* * * * *